United States Patent
Hufstedler et al.

(10) Patent No.: US 8,145,060 B2
(45) Date of Patent: Mar. 27, 2012

(54) PASSIVE OPTICAL NETWORK TRANSCEIVER WITH TEMPERATURE COMPENSATION CIRCUIT

(75) Inventors: Eric Hufstedler, Pasadena, CA (US); Xiaoming Lou, Arcadia, CA (US); Genzao Zhang, Ottawa (CA); Leonel Gomez, Burbank, CA (US); Eva Peral, Altadena, CA (US)

(73) Assignee: Emcore Corporation, Albuquerque, NM (US)

( * ) Notice: Subject to any disclaimer, the term of this patent is extended or adjusted under 35 U.S.C. 154(b) by 384 days.

(21) Appl. No.: 12/437,617

(22) Filed: May 8, 2009

(65) Prior Publication Data
US 2009/0279896 A1 Nov. 12, 2009

Related U.S. Application Data

(60) Provisional application No. 61/051,856, filed on May 9, 2008.

(51) Int. Cl.
*H04B 10/00* (2006.01)

(52) U.S. Cl. ........ 398/136; 398/135; 398/137; 398/138; 398/139; 398/210

(58) Field of Classification Search .......... 398/135–139, 398/210
See application file for complete search history.

(56) References Cited

U.S. PATENT DOCUMENTS

| | | | |
|---|---|---|---|
| 6,313,459 B1 * | 11/2001 | Hoffe et al. ............. | 250/214 R |
| 6,658,217 B2 * | 12/2003 | Ohhata et al. ............ | 398/202 |
| 7,217,914 B2 | 5/2007 | Stewart et al. | |
| 7,792,434 B2 * | 9/2010 | Ichino .................. | 398/208 |
| 2009/0080888 A1 * | 3/2009 | Sugawara et al. ......... | 398/61 |

* cited by examiner

Primary Examiner — Tod T Van Roy

(57) ABSTRACT

A passive optical network transceiver includes an avalanche photodiode, a bias voltage generator for supplying a bias voltage to the avalanche photodiode, a temperature detector for measuring the operating temperature of the avalanche photodiode, a memory for storing one reference bias voltage and a processing circuitry to process the value of the measured operating temperature and the reference bias voltage to generate a control signal for controlling the bias voltage generator to adjust the bias voltage supplied by the said bias voltage generator.

9 Claims, 3 Drawing Sheets

PASSIVE OPTICAL NETWORK TRANSCEIVER WITH TEMPERATURE COMPENSATION CIRCUIT

RELATED APPLICATION

The present application claims priority to U.S. Provisional Application Ser. No. 61/051,856 filed on May 9, 2008, herein incorporated by reference.

FIELD OF THE INVENTION

The present invention relates to a passive optical network (PON) transceiver.

DESCRIPTION OF THE RELATED ART

Fiber optic technology has been recognized for its high bandwidth capacity over longer distances, enhanced overall network reliability and service quality.

Fiber to the premises (FTTP), as opposed to fiber to the node (FTTN) or fiber to the curb (FTTC) delivery which still depend on copper wires for "last mile" (final connection) to the customers premises, enables service providers to deliver substantial bandwidth and a wide range of applications directly to business and residential subscribers. FTTP can be further categorized into fiber to the home (FTTH) and fiber to the building (FTTB).

For example, FTTP can accommodate the so-called "triple-play" bundle of services, e.g., high-speed Internet access and networking, multiple telephone lines and high-definition and interactive video applications. Utilizing FTTP, however, involves equipping each subscriber premises with the ability to receive an optical signal and convert it into a signal compatible with pre-existing wiring in the premises (e.g., twisted pair and coaxial). For bi-directional communication with the network, the premises should be equipped with the ability to convert outbound signals into optical signals. In some cases, these abilities are implemented with a passive optical network ("PON"), with each premises having a dedicated optical network unit ("ONU") for transceiving optical and electrical signals. Generally speaking, a PON is a point-to-multipoint fiber to the premises network architecture in which un-powered optical splitters are used to enable a single optical fiber to serve multiple (e.g., 32) premises.

The receiver section of a PON network is characterized by three main challenging features: maintain high sensitivity, report the received optical signal strength indication (RSSI), which is the input optical power level, and report an indication of the signal detect (SD) status, for example a binary indication would assign 1 to signal detected and 0 to signal not detected.

All the above three features must be cost effective. In particular, high sensitivity and RSSI should be accurate over a range of input optical power greater than 30 dB and all three should be accurate in a temperature range from −40° C. to +85° C.

U.S. Pat. No. 7,217,914 discloses a method for calibrating optoelectronic transceivers based upon an avalanche photodiode breakdown voltage. The method involves adjusting a reverse-bias voltage of the avalanche photodiode until avalanche breakdown of the avalanche photodiode occurs. An optimized APD reverse-bias voltage is then determined by reducing the reverse-bias voltage at which avalanche breakdown occurs by a predetermined offset voltage. This process is performed at a variety of different temperatures. Information concerning each temperature and the corresponding optimized APD reverse-bias voltage is then stored in a memory of the optoelectronic device.

Although the technique disclosed in the above mentioned U.S. patent is effective, the high cost limits its employment, particularly in FTTH PON products where low cost is demanded. In fact, it should be noted that optimization of the bias voltage for each temperature gives rise to loss of time during manufacturing and increases the cost of the final product.

Therefore, there is a need to address the above mentioned drawbacks associated with the known PON transceivers.

SUMMARY OF INVENTION

The present invention provides a PON transceiver with a low cost temperature compensation circuit.

According to one embodiment, the PON transceiver has an optical triplexer operating at an operating temperature with an avalanche photodiode for coupling to an optical fiber and for receiving an input optical signal, a bias voltage generator coupled to the avalanche photodiode for supplying a bias voltage to the avalanche photodiode, a temperature detector for measuring the operating temperature and for generating an operating temperature signal representative of the value of the measured operating temperature and a memory for storing one reference bias voltage value representative of the bias voltage maximizing sensitivity of the avalanche photodiode at one reference temperature.

The PON transceiver also comprises processing circuitry coupled to the temperature detector and to the bias voltage generator for receiving the operating temperature signal and processing the value of the measured operating temperature and the value of the reference bias voltage. Based on this processing, the processing circuitry generates a control signal for controlling the bias voltage generator to adjust the bias voltage supplied by the bias voltage generator to the avalanche photodiode. In at least one embodiment, the processing circuitry includes a microprocessor or microcontroller configured to carry out the desired processing through execution of stored program instructions. The processing circuitry additionally or alternatively includes a Complex Programmable Logic Device (CPLD), Field Programmable Gate Array (FPGA), or other digital processing circuit, configured to carry out the desired processing.

These and other features of the present teachings are set forth herein. Of course, other features and advantages of the present invention will become apparent to the one skilled in the art from the following drawings and description of various embodiments. The various aspects of the various embodiments may be used alone or in combination, as is desired.

BRIEF DESCRIPTION OF THE DRAWINGS

The skilled person will understand that the drawings described below, are for illustration purposes only. The drawings are not intended to limit the scope of the present teachings in any way.

In the following, various embodiments of the invention will be described in detail with reference to the accompanying drawings in which.

DESCRIPTION OF VARIOUS EMBODIMENTS

Figure 1:
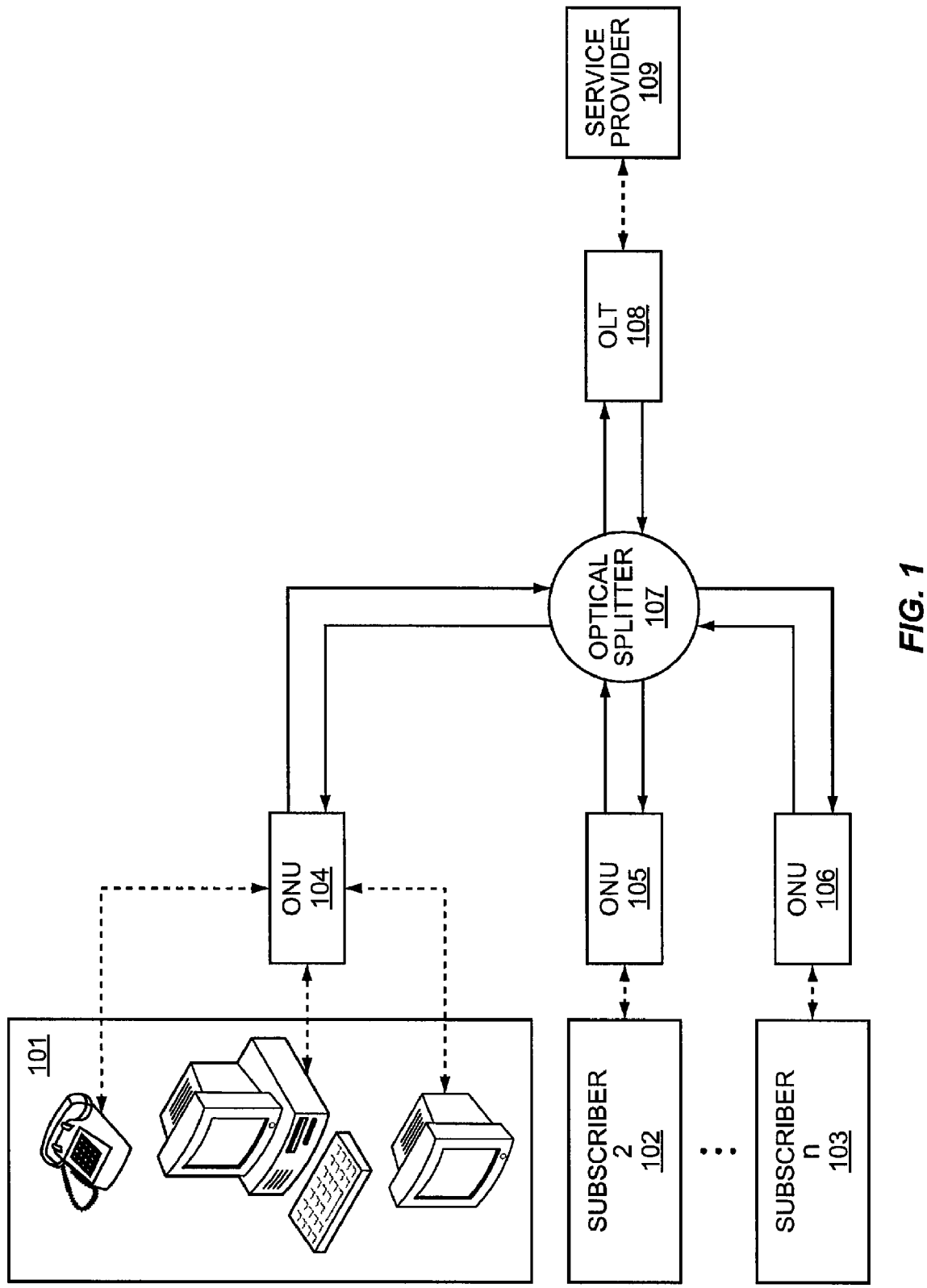
FIG. 1 is a block diagram illustrating an implementation of a PON (e.g., GPON) network architecture.

Referring to the attached figures, FIG. 1 illustrates an implementation of a network topology associated with a passive optical network, e.g., a GPON.

A typical passive optical network comprises an optical line termination unit 108 coupled to a service provider 109 that provides one or more data services to a group of subscribers 101-103.

The service provider 109 is adapted to provide the data services content via a non-optical link to the optical line termination unit ("OLT") 108. The OLT 108 is adapted to receive data from the service provider 109 in one format (e.g., electrical) and convert to an optical format. The OLT 108 is further adapted to receive data from subscribers 101-103 in an optical format and convert it to another format (e.g., electrical) for transmission to the service provider 109. In this implementation, the OLT 108 may be analogized to an electro-optical transceiver that receives upstream data in an optical format from subscribers, transmits downstream data in an optical format to subscribers, transmits the upstream data in electrical format to the service provider 109 and receives the downstream data from the service provider in an electrical format.

The OLT 108 is coupled to an optical splitter 107 via an optical link. The optical splitter 107 splits the incoming optical signal from the OLT 108 into multiple, substantially identical copies of the original incoming optical signal.

The optical splitter 107 provides substantially identical downstream signals to optical network units (ONUs), 104, 105, 106, respectively, associated with subscribers 101, 102, 103, respectively.

Each ONU, for example the ONU 104 receives a downstream signal and demultiplexes it into its constituent optical signals. These constituent optical signals are converted to corresponding electrical signal and transmitted via electrical links to the targeted hardware.

Figure 2:
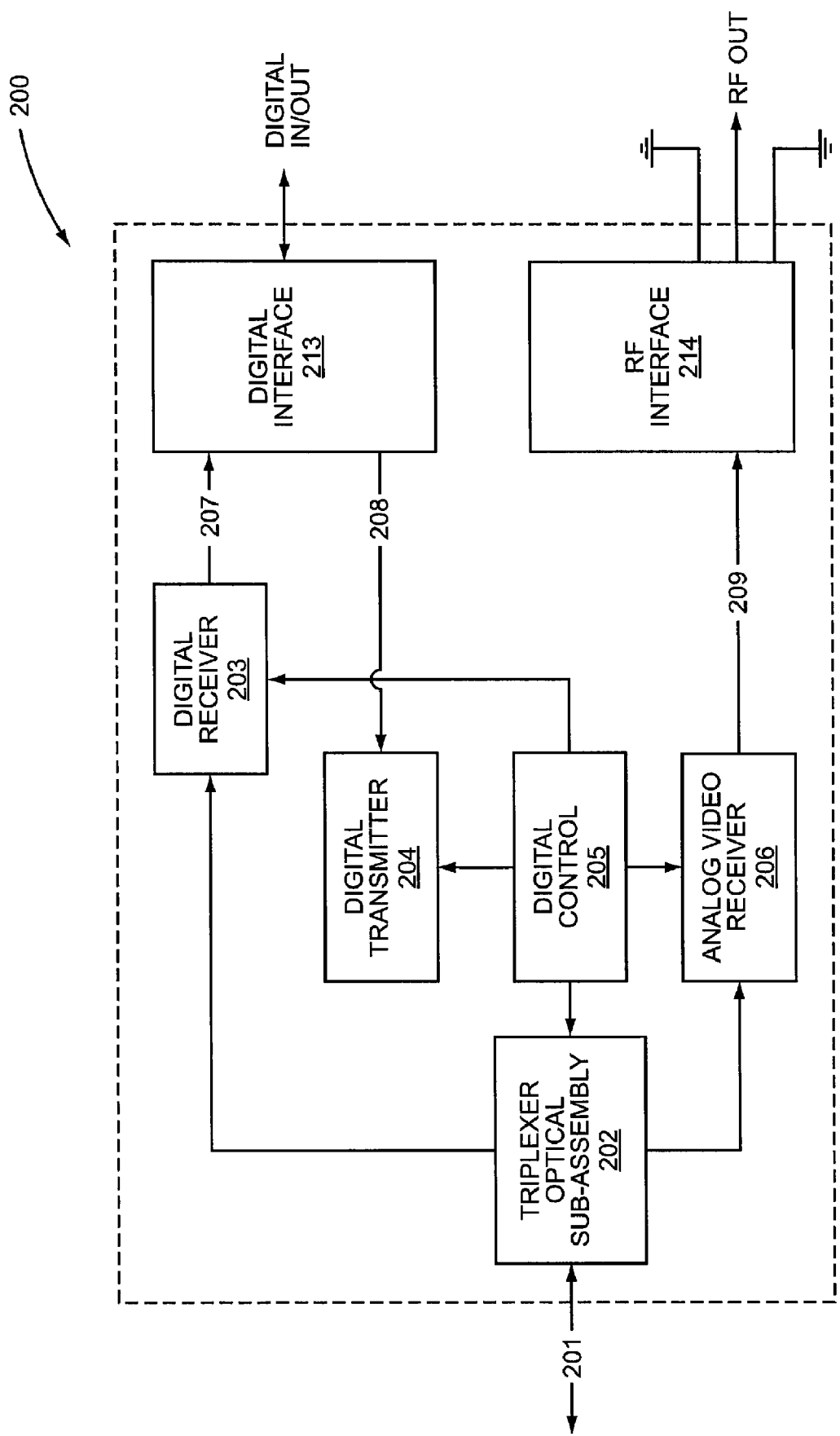
FIG. 2 is a block diagram of an implementation of a transceiver.

FIG. 2 illustrates a schematic of an implementation of a PON transceiver 200 that is disposed inside an ONU, e.g., ONU 104 of FIG. 1. The transceiver 200 comprises an optical triplexer 202 which is coupled to an optical fiber 201. The optical fiber 201 carries an upstream optical signal from an optical splitter, e.g., optical splitter 107 of FIG. 1, and carries a downstream optical signal to the optical splitter.

The triplexer 202 can take the form of a packaged electro-optical transceiver, and comprises one optical input/output port, coupled to optical fiber 201, two electrical outputs, one for data and one for video, and one electrical input, for upstream data. In the illustrated implementation, the triplexer demultiplexes the downstream optical signal into two constituent optical signals. The constituent optical signals are converted into electrical signals, e.g., by photodiodes, in particular avalanche photodiodes. The electrical signal corresponding to downstream data, e.g. from the 1490 nm optical signal, is transmitted to a digital receiver 203. The digital receiver 203, under control of digital control 205, provides an electrical data output signal 207. The digital control 205 ensures that the electrical signal 207 properly corresponds to the 1490 nm downstream optical signal according to one or more standards. For example, in a gigabit PON (GPON), the digital control 205 ensures that all upstream and downstream data is processed substantially in compliance with ITU-T G.984. The electrical data output signal 207 is coupled to a digital interface 213. The digital interface 213 is coupled to wiring in the subscriber's premises, e.g. via an adapter or other interface, and provides downstream data for telephone and data, e.g. via twisted-pair lines. The digital interface 213 also can transmit and receive data to/from televisions or set-top boxes, e.g., in connection with "on demand" programming.

The electrical signal corresponding to downstream video (e.g., from the 1550 nm optical signal) is transmitted to an analog video receiver 206, which comprises an amplifier. Under control of digital control 205, the analog video receiver generates (and subsequently amplifies) an RF electrical signal 209s. The RF electrical signal 209s is coupled to an RF interface 214. The RF interface 214 is coupled via an adapter or other interface (not shown) to television wiring in the subscriber's premises (e.g., coaxial cable). The RF interface 214 can include three terminals: two grounds and one signal, or it can be a coaxial connector.

Because television content may involve generating and receiving data aside from video content from analog video receiver 206 (e.g., in connection with ordering "on demand" content), the television wiring also may be coupled to the digital interface 213.

The triplexer 202 also generates an upstream, optical signal representative of data originating from the subscriber. The digital interface 213 receives data (in an electrical format) originating from, e.g., telephones, computers and set-top boxes associated with the subscriber. This received data 208 is sent to the digital transmitter 204. The digital transmitter 204, under control of digital control 205, converts the data into a format appropriate for triplexer 202 to convert to an optical signal that is transmitted on fiber 201.

Figure 3:
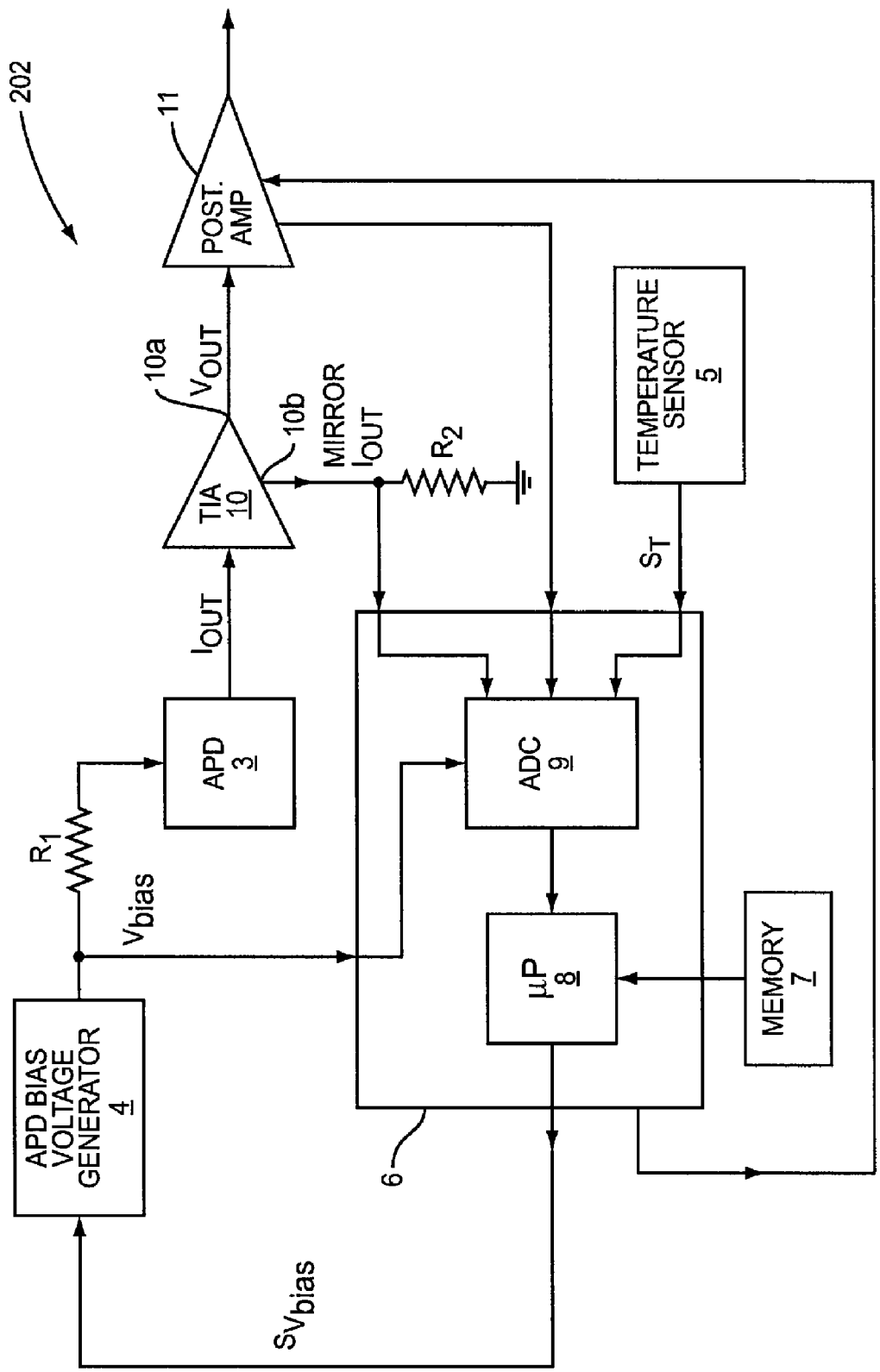
FIG. 3 is a block diagram of a triplexer included in the transceiver of FIG. 2.

FIG. 3 shows an implementation of the triplexer 202. The triplexer 202 comprises an avalanche photodiode 3, operating at an operating temperature T, for coupling to an optical fiber (not shown in the figures) and for receiving an input optical signal $S_{in}$ with input optical power $P_{in}$, and a bias voltage generator 4 coupled to the avalanche photodiode 3, through a resistor R1, for supplying a bias voltage Vbias to the avalanche photodiode 3.

The triplexer 202 also comprises a temperature detector 5 for measuring the operating temperature T and for generating an operating temperature signal $S_T$ representative of the measured value of the operating temperature T and a memory 7 for storing the reference bias voltage value $Vbias_{T0}$ representative of the bias voltage Vbias maximizing sensitivity of the avalanche photodiode 3 at one reference temperature T0.

With avalanche photodiodes, the gain setting, which is adjusted by the bias voltage Vbias, varies over temperature for optimum sensitivity.

To take into account both the change in breakdown voltage over temperature as well as the change in optimum gain over temperature, the triplexer 202 comprises processing circuitry 6 coupled to the memory 7, the temperature detector 5 and the bias voltage generator 4 for receiving the operating temperature signal $S_T$ and processing the value of the measured operating temperature T and the reference bias voltage value $Vbias_{T0}$ to generate a control signal $S_{Vbias}$ for controlling the bias voltage generator 4 to adjust the bias voltage Vbias supplied by the bias voltage generator 4 to the avalanche photodiode 3.

According to one embodiment, the processing circuitry 6 comprises a processor 8 coupled to the memory 7 for processing the values of the measured operating temperature T and the reference bias voltage $Vbias_{T0}$ to generate the control signal $S_{Vbias}$. The illustrated embodiment of the processing circuitry 6 further includes an analog to digital converter (ADC) 9. The ADC 9 is coupled to the temperature detector 5 for receiving the temperature signal $S_T$ and converting the received temperature signal $S_T$ into the value of the measured operating temperature T associated to the temperature signal $S_T$. Correspondingly, the ADC 9 is communicatively coupled to the processor 8, to provide the processor 8 with a (digitized) value representing the measured operating temperature T, as indicated by the temperature signal $S_T$.

In at least one embodiment, the processing circuitry 6 comprises an integrated processing circuit, e.g., an IC, that includes the processor 8 and the ADC 9, and, preferably, further includes at least a portion of the memory 7. As a non-limiting example, the processing circuitry 6 comprises a microcontroller that includes an integrated ADC and memory. In the same or other embodiments, the processing circuitry 6 may output the signal $S_{Vbias}$ as an analog control signal or as a digital control signal (e.g., PWM, PCM, binary, etc.) To that end, the processing circuitry 6 also may include a digital-to-analog converter (DAC), which may be included in the processor 8, along with the ADC 9, to convert digital values for $S_{Vbias}$ into analog signal values. Alternatively, any digital-to-analog conversion that is used may be performed by the APD bias voltage generator 4.

In any case, according to one or more embodiments, the processor 8 is configured to process the values of the measured operating temperature T and the reference bias voltage $Vbias_{T0}$ (e.g., as stored in the memory 7) to calculate a temperature-compensated bias voltage value $Vbias_T$ to adjust the value of the bias voltage supplied to the avalanche photodiode 3 at the measured operating temperature T.

Particularly, in one or more embodiments, the processor 8 is configured to determine the value of the signal $S_{Vbias}$ that will control the APD bias voltage generator 4 to output a temperature-compensated Vbias signal that is optimized for the measured operating temperature T. Thus, with reference to FIG. 3, the processing circuitry 6 determines the correct bias voltage for the currently measured operating temperature, referred to as $Vbias_T$. Correspondingly, the processing circuitry 6 generates or otherwise controls the adjustment signal $S_{Vbias}$ such that the APD bias voltage generator 4 outputs the bias voltage Vbias at or substantially at the desired value $Vbias_T$. This closed loop, temperature-based bias adjustment process may be carried out as needed, such as by detecting more than a threshold amount of temperature increase or decrease, or by periodically performing a $S_T$ signal measurement and corresponding $Vbias_T$ calculation and $S_{Vbias}$ adjustment.

Regardless, according to the teachings herein the avalanche photodiode 3 operates with a temperature-compensated bias voltage that is advantageously determined using single reference point compensation. Upon receiving the input optical signal $S_{in}$, the avalanche photodiode 3 outputs a current signal $I_{out}$. The processing circuitry 6 is also configured to measure the value of current $I_{out}$ output from the avalanche photodiode 3 and convert this value of measured current $I_{out}$ into input optical power $P_{in}$, as received by the avalanche photodiode 3 and associated to the input optical signal $S_{in}$. This value of input optical power $P_{in}$ is associated to the characteristics parameter RSSI (received optical signal strength indication).

It should be noted that the gain in the avalanche photodiode 3 is not constant. As the gain changes over temperature, the average current output from the avalanche photodiode 3 also changes even if the input optical power $P_{in}$ remains constant so that the reported RSSI would be erroneous. To take into account of this variation of the avalanche photodiode gain over temperature, the processing circuitry 6 is configured to process the values of the measured operating temperature T and the input optical power $P_{in}$ to calculate a temperature-compensated input optical power value $P_{inT}$. The temperature compensation is linear with temperature. Thus, a compensated measure of $P_{in}(T)$ may be determined as, for example, $P_{in}(T)=P_{in}+A*T$, where $P_{in}$ is the uncompensated or "raw" determination of input optical power to the avalanche photodiode 3, and where the coefficient A is determined empirically in one or more embodiments. The value of A may be represented in configuration memory, program code, etc.

It should be noted that with high optical input powers $P_{in}$ to the avalanche photodiode 3, the bias voltage generator 4 can be overloaded resulting in a drop in the supplied bias voltage Vbias and in the gain of the avalanche photodiode 3 with consequences in the reported RSSI. Accordingly, the processing circuitry 6 is coupled to the output of the bias voltage generator 4 for measuring the value Vbias of the bias voltage supplied by the bias voltage generator 4 to the avalanche photodiode 3 and to process the values of the measured bias voltage Vbias and the input optical power $P_{in}$ to calculate a voltage-compensated input optical power value $P_{inV}$.

To this purpose, the ADC 9 may be coupled to the bias voltage generator 4 for measuring the value of bias voltage Vbias supplied by the bias voltage generator 4 to the avalanche photodiode 3. Note, too, that the aforementioned temperature-compensated determination of $P_{in}$ can be done with or in addition to voltage-compensated $P_{in}$ determination, such that the processor 8 determines and operates using a measure of $P_{in}$ that is both temperature compensated and voltage compensated.

According to one embodiment, the triplexer 202 comprises a transimpedance amplifier 10 coupled to the output of the avalanche photodiode 3 for receiving the current signal $I_{out}$. The transimpedance amplifier 10 comprises a voltage output 10a to output an amplified voltage signal $V_{out}$ and a current output 10b to output a mirror current $I_{out}$ substantially corresponding to the current output from the avalanche photodiode 3. In particular, the current output 10b is coupled to an earth ground through a resistor R2. In this case, the processing circuitry 6 is coupled to the current output 10b of the transimpedance amplifier 10 to measure the value of the mirror current $I_{out}$ and convert the value of this mirror current $I_{out}$ into input optical power $P_{in}$ of the avalanche photodiode 3.

To convert current values into optical power values, the memory 7 stores a lookup table comprising a plurality of current values associated to a corresponding plurality of optical power values at the reference temperature T0.

According to a further embodiment, the triplexer 202 comprises an amplification circuitry 11 coupled to the transimpedance amplifier 10 for receiving the amplified voltage signal $V_{out}$ and to output to the processing circuitry 6 a signal-detect signal having a value depending on the value of the voltage level of the amplified voltage signal $V_{out}$ and a value of reference signal detection threshold $V_{th}$ set at the reference temperature T0 and stored in the memory 7.

Since also the input level of signal to the amplification circuitry 11 is dependant on the gain of the avalanche photodiode 3, which in turn varies over temperature, the value of reference signal detection threshold $V_{th}$ has to be temperature compensated. To this purpose, the processing circuitry 6 is configured to process the values of the measured operating temperature T and the reference signal detection threshold $V_{th}$ to calculate a temperature-compensated signal detection threshold $V_{thT}$. This temperature compensation is also linear with temperature, with the slope having been determined empirically.

According to the embodiment shown in the figures, the amplification circuitry 11 comprises a post amplifier to output a signal $V_{rx}$ to an optical network termination unit of the passive optical network (not shown in the figures). The signal $V_{rx}$ may be an analog signal, although it may be constrained or otherwise limited, such as by passing it through a limiting amplifier. In other embodiments, $V_{rx}$ is a digital signal.

According to a further aspect, the present invention relates to a method for controlling an electro-optical transceiver, e.g., transceiver 200/triplexer 202 as shown in FIG. 2. The method comprises the steps of:

supplying a bias voltage Vbias to the avalanche photodiode 3, providing a value of reference bias voltage $Vbias_{T0}$ representative of the bias voltage maximizing sensitivity of the avalanche photodiode 3 at one reference temperature T0, measuring the value of the operating temperature T, and processing the values of the measured operating temperature T and the reference bias voltage $Vbias_{T0}$ to adjust the bias voltage supplied to said avalanche photodiode.

According to one embodiment, the reference bias voltage $Vbias_{T0}$ is generated through following steps:

removing optical power input to the avalanche photodiode 3, supplying a bias voltage Vbias to the avalanche photodiode at the operating temperature T0 representing the reference temperature, Quickly finding the approximate breakdown voltage, Reducing the voltage a known amount, Re-supplying optical power to enable optimizing the setting, adjusting the bias voltage Vbias to maximize the sensitivity to obtain an optimized bias voltage VbiasOPT, reducing the maximized bias voltage VbiasOPT by a predefined amount to obtain the reference bias voltage $Vbias_{T0}$, and storing the reference bias voltage $Vbias_{T0}$ into the memory 7.

In particular, adjusting the bias voltage may be performed by increasing quickly the bias voltage until the output current signal $I_{out}$ from the transimpedance amplifier 10 increases. This indicates that the bias voltage is above the breakdown voltage of the avalanche photodiode 3, which means that it is for example about 3V above the optimum bias voltage.

The reduction of the optimized bias voltage VbiasOPT by a predefined amount is performed to anticipate the aging of the avalanche photodiode. For example the predetermined amount may be 0.5V.

According to one embodiment, the processing step comprises processing the values of the measured operating temperature T and reference bias voltage $Vbias_{T0}$ to calculate a temperature-compensated bias voltage $Vbias_T$ value to adjust the value of the bias voltage supplied to the avalanche photodiode 3. That is, the $S_{Vbias}$ signal may be generated or otherwise controlled to cause the APD bias voltage generator 4 to output the signal Vbias at or substantially at the targeted value $Vbias_T$.

To evaluate the RSSI parameter, the processing step comprises measuring the value of the current $I_{out}$ output from the avalanche photodiode 3 and converting the value of the measured current $I_{out}$ into input optical power $P_{in}$.

The conversion is carried out by providing a lookup table comprising a plurality of current values associated to a corresponding plurality of optical power values at the reference temperature T0 and accessing this lookup table to convert the value of the measured current $I_{out}$ into input optical power $P_{in}$.

In particular, the lookup table is generated by measuring the output current $I_{out}$ from the avalanche photodiode 3 at two distinct levels of input optical power, for example at −29 dBm and −12 dBm. Using these two readings, the lookup table can be generated.

According to one embodiment, the processing step comprises processing the values of the measured operating temperature T and of the input optical power $P_{in}$ to calculate a temperature-compensated input optical power value $P_{inT}$.

Furthermore, the method may comprise measuring the value of the bias voltage Vbias supplied to the avalanche photodiode 3 so that the values of said measured bias voltage Vbias and the input optical power $P_{in}$ may be processed to calculate a voltage-compensated input optical power $P_{inV}$.

With reference to the signal-detect signal, the method comprises the steps of:

providing a value of reference signal detection threshold $V_{th}$ set at the reference temperature T0, processing the values of the measured operating temperature T and the reference signal detection threshold $V_{th}$ to calculate a temperature-compensated signal detection threshold $V_{thT}$.

From the discussion above, it should be clear to those skilled in the art that the present invention provides a PON transceiver with a low cost temperature compensation circuitry.

While particular embodiments of the present invention have been shown and described, it will be understood by those skilled in the art that, based upon the teachings herein, changes and modifications may be made without departing from this invention and its broader aspects and, therefore, the appended claims are to encompass within their scope all such changes and modifications as are within the scope of this invention. Furthermore, it is to be understood that the invention is solely defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. A transceiver for use in a passive optical network, said passive optical network comprising an optical line termination unit coupled to a service provider for providing downstream data and receiving upstream data in an optical format to and from subscribers, a passive optical splitter coupled to the optical line termination unit and disposed at a location remote therefrom, the passive optical splitter adapted to divide the downstream data into multiple downstream optical signals and further adapted to receive multiple upstream optical signals, and transceivers, each associated with a respective subscriber and adapted to receive a downstream input optical signal and transmit an upstream optical signal, said transceiver comprising an optical triplexer, wherein the optical triplexer comprises:

an avalanche photodiode, for coupling to an optical fiber and for receiving an input optical signal, wherein said avalanche photodiode outputs a current signal;

a bias voltage generator coupled to said avalanche photodiode for supplying a bias voltage to said avalanche photodiode;

a temperature detector for measuring an operating temperature of said avalanche photodiode and for generating an operating temperature signal representative of the value of the measured operating temperature;

a memory for storing one reference bias voltage value representative of the bias voltage maximizing sensitivity of the avalanche photodiode at one reference temperature;

processing circuitry coupled to said memory, temperature detector and bias voltage generator for receiving said operating temperature signal and processing the value of the measured operating temperature and said one reference bias voltage to generate a control signal for controlling said bias voltage generator to adjust the bias voltage supplied by said bias voltage generator to said avalanche photodiode, wherein said processing circuitry is configured to measure the value of current output from said avalanche photodiode and convert the value of said measured current into input optical power;

a transimpedance amplifier coupled to the output of said avalanche photodiode for receiving said current signal and comprising a voltage output to output an amplified voltage signal and a current output to output a mirror current corresponding to the current output from said avalanche photodiode, wherein said processing circuitry is coupled to said current output of the transimpedance amplifier to measure the value of said mirror current and convert the value of said mirror current into input optical power; and an amplification circuitry coupled to said transimpedance amplifier for receiving said amplified voltage signal and to output to said processing circuitry a signal-detect signal depending on the value of the voltage of said amplified voltage signal and a value of reference signal detection threshold set at said one reference temperature, wherein said memory is configured to store said value of reference signal detection threshold, and said processor is configured to process the values of said measured operating temperature and said reference signal detection threshold to calculate a temperature-compensated signal detection threshold.

2. The transceiver according to claim 1, wherein said processing circuitry comprises a processor coupled to said memory for processing the values of the measured operating temperature and the reference bias voltage to generate said control signal.

3. The transceiver according to claim 2, wherein said processing circuitry comprises an analog to digital converter coupled to said temperature detector and to said processor for receiving said temperature signal and converting said temperature signal into said value of the measured operating temperature associated to said temperature signal.

4. The transceiver according to claim 1, wherein said processor is configured to process the values of said measured operating temperature and said reference bias voltage to calculate a temperature-compensated bias voltage value to adjust the value of the bias voltage supplied to said avalanche photodiode.

5. The transceiver according to claim 1, wherein said processing circuitry is configured to process the values of said measured operating temperature and said input optical power to calculate a temperature-compensated input optical power value.

6. The transceiver according to claim 1, wherein said processing circuitry is coupled to the output of said bias voltage generator for measuring the value of the bias voltage supplied by said bias voltage generator to said avalanche photodiode and to process the values of said measured bias voltage and said input optical power to calculate a voltage-compensated input optical power value.

7. The transceiver according to claim 6, wherein said processing circuitry comprises an analog-to-digital converter coupled to said bias voltage generator for measuring the value of bias voltage supplied by said bias voltage generator to said avalanche photodiode.

8. The transceiver according to claim 1, wherein said memory is configured to store a lookup table for the conversion of values of mirror current into input optical power.

9. The transceiver according to claim 1, wherein said amplification circuitry comprises a post amplifier to output an analog signal to an optical network termination unit of said passive optical network.

* * * * *